(12) United States Patent
Stites et al.

(10) Patent No.: US 9,821,521 B2
(45) Date of Patent: Nov. 21, 2017

(54) GOLF CLUB HEADS INCLUDING A POLYMERIC BODY IN WHICH A PART OF A FRAME OR BASE MEMBER IS EMBEDDED

(71) Applicant: NIKE, Inc., Beaverton, OR (US)

(72) Inventors: John T. Stites, Sallisaw, OK (US); Gary G. Tavares, Southbridge, MA (US); Todd Anthony Waatti, Battleground, WA (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 334 days.

(21) Appl. No.: 14/606,258

(22) Filed: Jan. 27, 2015

(65) Prior Publication Data

US 2015/0141164 A1    May 21, 2015

Related U.S. Application Data

(63) Continuation of application No. 14/340,822, filed on Jul. 25, 2014, which is a continuation of application
(Continued)

(51) Int. Cl.
*A63B 53/04* (2015.01)
*B29C 70/68* (2006.01)
(Continued)

(52) U.S. Cl.
CPC .......... *B29C 70/68* (2013.01); *A63B 53/0466* (2013.01); *A63B 53/0487* (2013.01);
(Continued)

(58) Field of Classification Search
None
See application file for complete search history.

(56) References Cited

U.S. PATENT DOCUMENTS 2,349,549 A    5/1944   Hardman et al.
2,534,947 A   12/1950   Bright
(Continued)

FOREIGN PATENT DOCUMENTS

JP    S63-71272 A    3/1988
JP       6510689      6/1994
(Continued)

OTHER PUBLICATIONS

Oct. 15, 2009—(WO) International Search Report—App. PCT/US2008/058880.
(Continued)

*Primary Examiner* — Christina Johnson
*Assistant Examiner* — Mohammad M Ameen

(57) ABSTRACT

Wood-type golf clubs and/or golf club heads include: (a) a golf club head base member including a face member having a ball striking face; and (b) a polymeric body member engaged with the golf club head base member, wherein the polymeric body member is formed via a rotational molding process (or other centrifugal force inducing molding process) and/or engaged with the golf club head base member via a rotational molding process (or other centrifugal force inducing molding process). The polymeric body member forms at least a portion of a crown member of the club head in some structures.

16 Claims, 8 Drawing Sheets

Related U.S. Application Data

No. 11/697,007, filed on Apr. 5, 2007, now Pat. No. 8,814,723.

(51) Int. Cl.

| | | |
|---|---|---|
| *B29C 41/20* | (2006.01) | |
| *B29C 41/04* | (2006.01) | |
| *B29K 101/00* | (2006.01) | |
| *B29K 705/00* | (2006.01) | |
| *B29L 31/52* | (2006.01) | |

(52) U.S. Cl.
CPC ............ *B29C 41/20* (2013.01); *B29C 70/681* (2013.01); *A63B 2053/042* (2013.01); *A63B 2053/0416* (2013.01); *A63B 2053/0433* (2013.01); *A63B 2053/0437* (2013.01); *A63B 2053/0491* (2013.01); *A63B 2209/00* (2013.01); *A63B 2209/02* (2013.01); *B29C 41/04* (2013.01); *B29K 2101/00* (2013.01); *B29K 2705/00* (2013.01); *B29L 2031/5227* (2013.01)

(56) References Cited

U.S. PATENT DOCUMENTS

| | | | |
|---|---|---|---|
| 4,591,160 A | 5/1986 | Piragino | |
| 4,762,322 A | 8/1988 | Molitor et al. | |
| 4,874,171 A | 10/1989 | Ezaki et al. | |
| 5,205,560 A | 4/1993 | Hoshi et al. | |
| 5,316,298 A | 5/1994 | Hutin et al. | |
| 5,328,176 A | 7/1994 | Lo | |
| 5,410,798 A | 5/1995 | Lo | |
| 5,624,331 A | 4/1997 | Lo et al. | |
| 5,997,415 A | 12/1999 | Wood | |
| 6,059,669 A | 5/2000 | Pearce | |
| 6,183,377 B1 | 2/2001 | Liang | |
| 6,354,963 B1 | 3/2002 | Kodama et al. | |
| 6,558,271 B1 * | 5/2003 | Beach .................. | A63B 53/04 473/327 |
| 6,755,239 B2 | 6/2004 | Ray et al. | |
| 6,776,214 B2 | 8/2004 | Ray et al. | |
| 6,986,716 B2 | 1/2006 | Lukasiewicz, Jr. et al. | |
| 7,008,332 B2 | 3/2006 | Liou | |
| 7,032,639 B2 | 4/2006 | Lukasiewicz, Jr. et al. | |
| 7,059,972 B2 | 6/2006 | Miyamoto | |
| 7,059,973 B2 | 6/2006 | Erickson et al. | |
| 7,066,835 B2 | 6/2006 | Evans et al. | |
| 7,074,136 B2 | 7/2006 | Noguchi et al. | |
| 7,258,624 B2 | 8/2007 | Kobayashi | |
| 7,258,630 B2 | 8/2007 | Erickson et al. | |
| 7,273,419 B2 | 9/2007 | Evans et al. | |
| 7,285,593 B1 | 10/2007 | Giardello et al. | |
| 7,297,074 B2 | 11/2007 | Kumamoto | |
| 7,338,390 B2 | 3/2008 | Lindsay | |
| 7,361,100 B1 * | 4/2008 | Morales ............. | A63B 53/0466 473/346 |
| 7,399,237 B2 | 7/2008 | Evans et al. | |
| 7,632,195 B2 | 12/2009 | Jorgensen | |
| 8,814,723 B2 | 8/2014 | Tavares et al. | |
| 2002/0193175 A1 | 12/2002 | Soracco et al. | |
| 2004/0147342 A1 | 7/2004 | Lindsay | |
| 2004/0192468 A1 | 9/2004 | Onoda et al. | |
| 2004/0248667 A1 | 12/2004 | Cackett et al. | |
| 2005/0026723 A1 | 2/2005 | Kumamoto | |
| 2005/0215354 A1 | 9/2005 | Kumamoto | |
| 2005/0261082 A1 | 11/2005 | Yamamoto | |
| 2006/0046869 A1 | 3/2006 | Galloway | |
| 2006/0052181 A1 | 3/2006 | Serrano et al. | |
| 2006/0055077 A1 | 3/2006 | Heikkila | |
| 2006/0058115 A1 | 3/2006 | Erickson et al. | |
| 2006/0084525 A1 | 4/2006 | Imamoto et al. | |
| 2006/0128501 A1 | 6/2006 | Rice | |
| 2006/0135281 A1 | 6/2006 | Palumbo et al. | |
| 2007/0037633 A1 | 2/2007 | Thielen | |
| 2007/0054751 A1 | 3/2007 | Breier et al. | |

FOREIGN PATENT DOCUMENTS

| | | |
|---|---|---|
| JP | 07068575 | 3/1995 |
| JP | 031909501 | 5/2005 |
| JP | 2006130065 A | 5/2006 |
| JP | 2006288882 A | 10/2006 |
| TW | M246022 U | 10/2004 |
| TW | M299009 U | 10/2006 |
| WO | 2004043550 A1 | 5/2004 |

OTHER PUBLICATIONS

R.J. Crawford and M.P. Kearns "Practical Guide to Rotational Molding," ISBN 1-85957-387-8, Published 2003, ChemTec Publishing, internet search on Dec. 29, 2006 [http://www.chemtec.org/books/rap/rap_160.html].

Wikipedia, the free encyclopedia: "Rotational Molding" interenet search on Dec. 29, 2006 [http://en.wikipedia.org/wiki/Rotational_molding].

BPF (British Plastics Federal) "Rotational Moulding Overview" internet search on Dec. 29, 2006[http://www.bpf.co.uk/bpfindustry/process_plastics_rotational-moulding.cfm].

Pennsylvania College of Technology, PREP site, Rotational Molding. Animation by Ian R. Harrison at Penn State University as part of a series on Polymer Science and Engineering topics covering Properties, Characterization and Processing, internet search on Dec. 29, 2006 [http://www.pct.edu/prep/rm.htm].

Suba, Larry, Akro Plastics "Rotational Molding" Invention City, internet search on Dec. 29, 2006 [http://www.inventioncity.com\rotational.html].

Sep. 4, 2008—(WO) International Search Report—App PCT/US2008/058880.

First Office Action issued in corresponding Chinese Patent Application, Application No. 2008100845695, dated Mar. 2, 2010.

Office Action issued in related U.S. Appl. No. 12/880,745 dated Nov. 23, 2010.

Office Action from Japanese Application No. 2010-502232, dated Jan. 11, 2012.

Office Action from European Application No. 08744759.5, dated Jul. 11, 2012.

Search Report from Taiwan Application No. 97112156, dated Mar. 25, 2013.

Office Action issued in related U.S. Appl. No. 12/880,745, dated May 11, 2011.

* cited by examiner

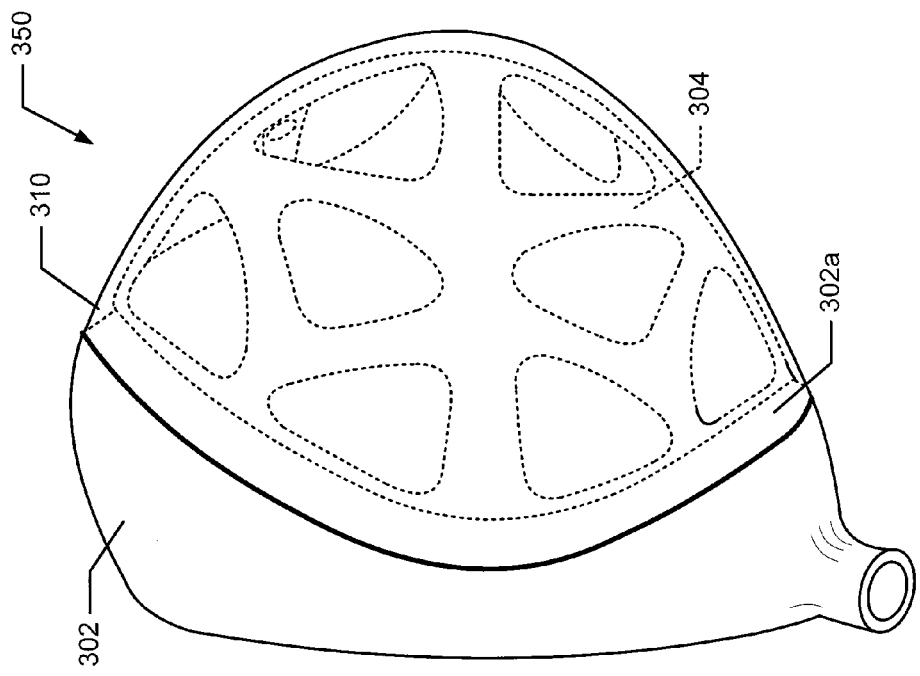
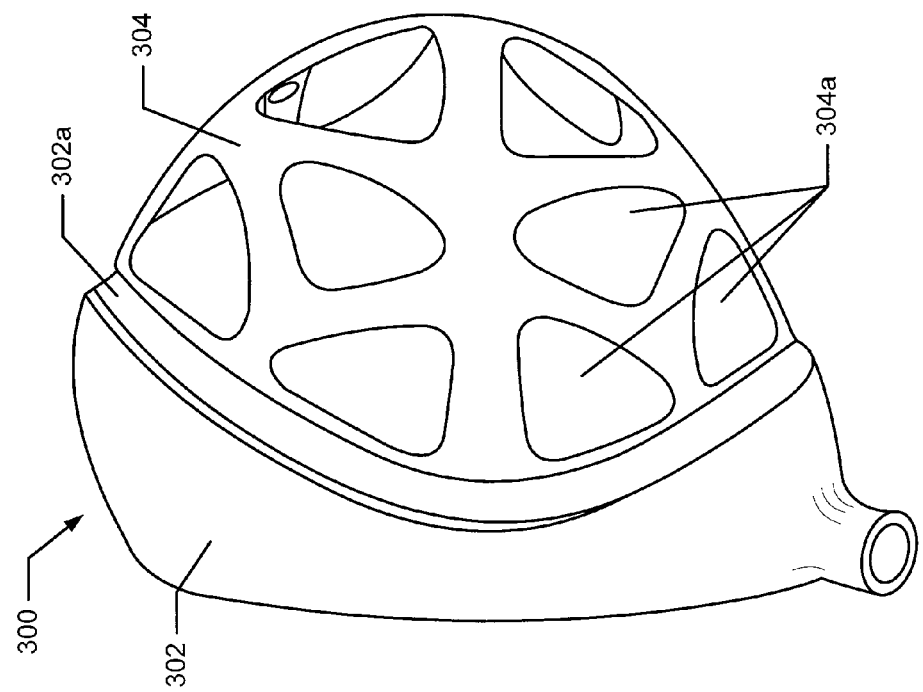
Fig. 3A
Fig. 3B

GOLF CLUB HEADS INCLUDING A POLYMERIC BODY IN WHICH A PART OF A FRAME OR BASE MEMBER IS EMBEDDED

RELATED APPLICATION DATA

This application is a continuation of co-pending U.S. patent application Ser. No. 14/340,822 filed Jul. 25, 2014, which application is a continuation of U.S. patent application Ser. No. 11/697,007, filed Apr. 5, 2007 (now U.S. Pat. No. 8,814,723B2). Each of these priority applications is entirely incorporated herein by reference.

FIELD OF THE INVENTION

This invention relates generally to golf clubs and golf club heads, including "wood-type" golf clubs and golf club heads, e.g., for drivers, fairway woods, "wood-type" hybrid or utility clubs, or the like. Additional aspects of this invention relate to methods for making such golf club heads that include rotational or other centrifugal force based molding techniques.

BACKGROUND

Golf is enjoyed by a wide variety of players—players of different genders and dramatically different ages and/or skill levels. Golf is somewhat unique in the sporting world in that such diverse collections of players can play together in golf events, even in direct competition with one another (e.g., using handicapped scoring, different tee boxes, in team formats, etc.), and still enjoy the golf outing or competition. These factors, together with the increased availability of golf programming on television (e.g., golf tournaments, golf news, golf history, and/or other golf programming) and the rise of well known golf superstars, at least in part, have increased golf's popularity in recent years, both in the United States and across the world.

Golfers at all skill levels seek to improve their performance, lower their golf scores, and reach that next performance "level." Manufacturers of all types of golf equipment have responded to these demands, and in recent years, the industry has witnessed dramatic changes and improvements in golf equipment. For example, a wide range of different golf ball models now are available, with balls designed to complement specific swing speeds and/or other player characteristics or preferences, e.g., with some balls designed to fly farther and/or straighter; some designed to provide higher or flatter trajectories; some designed to provide more spin, control, and/or feel (particularly around the greens); some designed for faster or slower swing speeds; etc. A host of swing and/or teaching aids also are available on the market that promise to help lower one's golf scores.

Being the sole instrument that sets a golf ball in motion during play, golf clubs also have been the subject of much technological research and advancement in recent years. For example, the market has seen dramatic changes and improvements in putter designs, golf club head designs, shafts, and grips in recent years. Additionally, other technological advancements have been made in an effort to better match the various elements and/or characteristics of the golf club and characteristics of a golf ball to a particular user's swing features or characteristics (e.g., club fitting technology, ball launch angle measurement technology, ball spin rates, etc.).

Despite recent technological advances, "wood-type" golf clubs, particularly the driver, can be very difficult for some players to hit consistently well. Accordingly, additional technological advances that improve a player's ability to get a golf ball airborne; increase distance, direction, and/or control; and/or otherwise improve the playability of wood-type golf clubs, particularly the driver, would be welcome in the golf world.

SUMMARY

The following presents a general summary of aspects of the invention in order to provide a basic understanding of the invention and various aspects of it. This summary is not intended to limit the scope of the invention in any way, but it simply provides a general overview and context for the more detailed description that follows.

In general, some example aspects of this invention relate to wood-type golf clubs and/or golf club heads (such as drivers, fairway woods, "wood-type" utility or hybrid clubs, and the like). Golf club heads and golf clubs in accordance with at least some examples of this invention include club head structures having: (a) a golf club head base member, including a golf club head face member having a ball striking face engaged therewith or integrally formed therewith as a unitary one piece construction; and (b) a polymeric body member engaged with the golf club head base member via a rotational molding process (or other centrifugal force inducing molding process), wherein the polymeric body member forms at least a portion of a crown member of the golf club head. Alternatively, if desired in at least some examples of this invention, the polymeric body member may be separately formed by a rotational molding process and then engaged with the golf club head base member. Golf clubs and/or golf club heads in accordance with examples of this invention may include additional features, such as: one or more weight elements (optionally a movable or removable weight), a shaft member, a handle member, a grip element, a metallic coating or layer over the polymeric material, etc.

Methods of making golf club head structures in accordance with examples of this invention may include: (a) engaging a golf club head base member with at least a portion of a mold, wherein the base member includes at least a portion of a golf club head face member (and optionally, at least a portion of a sole member, a skirt member, a crown member, an aft body member, a frame member, etc.); (b) placing a material for forming a portion of a golf club body member into at least a portion of the mold; and (c) moving the mold with the material therein and with the golf club head base member engaged therewith to position the material at one or more desired locations with respect to the golf club head base member (e.g., at a crown portion, at a skirt portion, at a sole portion, as an aft body portion, to cover a frame member, etc.). Such procedures may include rotational molding or other centrifugal force inducing movement processes. Alternatively, if desired, the rotational molding process may occur on the material for forming a portion of the body member alone (i.e., without the club head base member included in the mold), and the rotational molded part may then later be engaged with the remainder of the club head base member (e.g., by adhesives or cements, by mechanical connectors, etc.). The polymeric material also may be at least partially covered or coated with a metal or metal alloy material. Such club head structures may be incorporated into an overall golf club structure and/or used as a golf club in any desired manner, including in conventional manners that are known and used in the art.

BRIEF DESCRIPTION OF THE DRAWINGS

A more complete understanding of the present invention and certain advantages thereof may be acquired by referring to the following detailed description in consideration with the accompanying drawings, in which:

FIGS. 3A and 3B illustrate additional features of one example golf club head structure in accordance with this invention;

Figure 1:
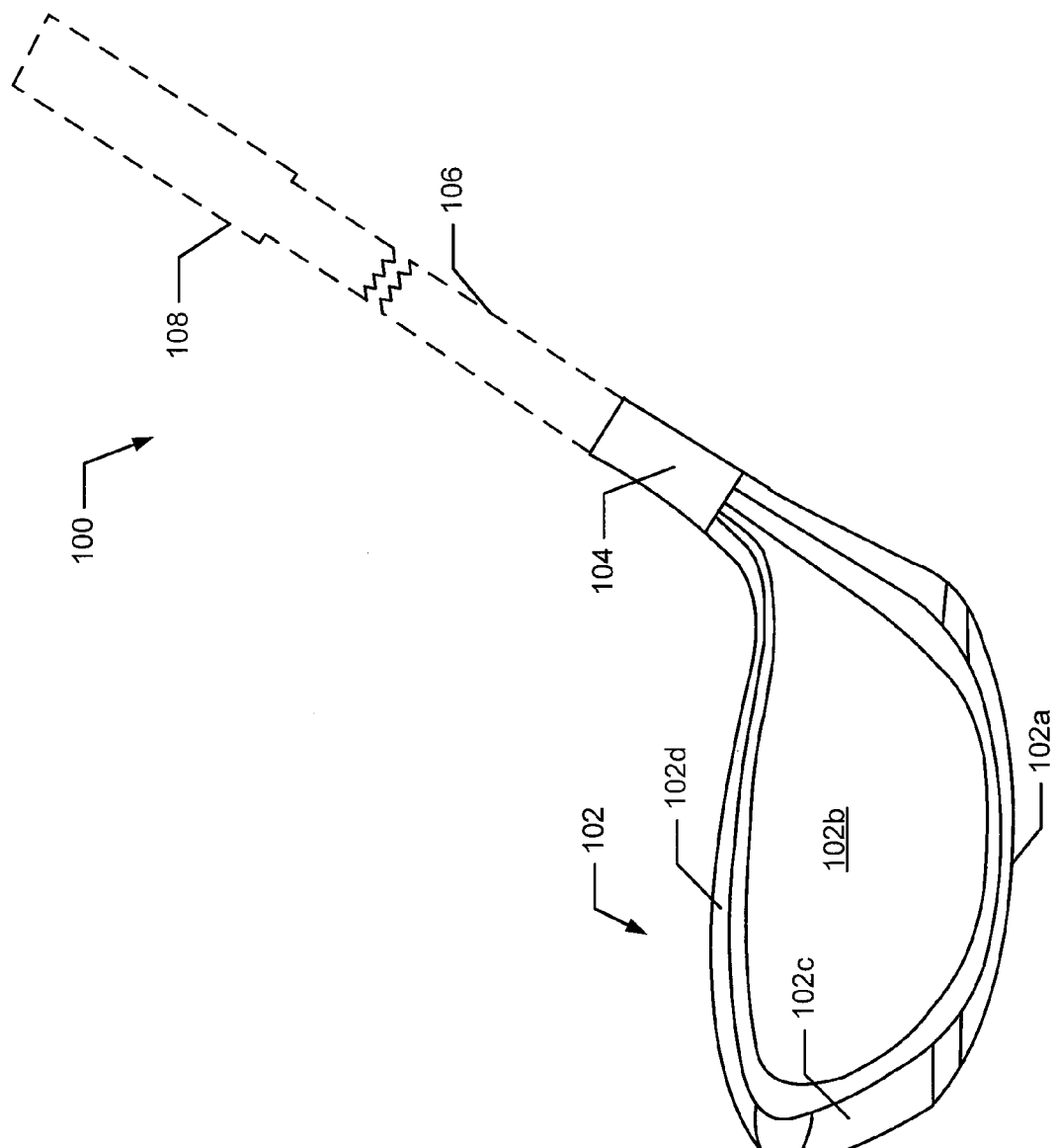
FIG. 1 provides a general view of an example golf club structure in accordance with this invention.

The reader is advised that the attached drawings are not necessarily drawn to scale.

DETAILED DESCRIPTION

In the following description of various example structures in accordance with the invention, reference is made to the accompanying drawings, which form a part hereof, and in which are shown by way of illustration various example golf club heads and golf club structures in accordance with the invention. Additionally, it is to be understood that other specific arrangements of parts and structures may be utilized, and structural and functional modifications may be made without departing from the scope of the present invention. Also, while the terms "top," "bottom," "front," "back," "rear," "side," "underside," "overhead," and the like may be used in this specification to describe various example features and elements of the invention, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this invention.

A. General Description of Golf Club Heads and Golf Clubs According to Examples of the Invention In general, as described above, aspects of this invention relate to wood-type golf club heads, golf clubs, and the like (such as drivers or fairway woods, "wood-type" utility or hybrid clubs, and/or the like), as well as to methods of making and using such clubs and club heads. Golf club heads in accordance with at least some examples of this invention include: (a) a golf club head base member, including a golf club head face member having a ball striking face engaged therewith or integrally formed therewith as a unitary one piece construction; and (b) a polymeric body member engaged with the golf club head base member via a rotational molding process (or other centrifugal force inducing molding process), wherein the polymeric body member forms at least a portion of a crown member of the golf club head.

The golf club head base member may include additional features of an overall golf club head structure, such as a sole portion (e.g., engaged with the face member or integrally formed with the face member as a unitary one piece construction); a skirt portion (e.g., engaged with the face member and/or the sole member or integrally formed with the face member and/or the sole member as a unitary one piece construction); an aft body portion (e.g., a frame member, optionally with one or more openings defined therein) forming at least part of one or more of a crown portion, a skirt portion, and/or a sole portion of the club head body; a hosel portion; etc. Similarly, the polymeric body member may include or form various additional portions or features of an overall golf club head structure, such as a sole portion; a skirt portion; an aft body portion; etc. The polymeric body member may engage with the club head base member, e.g., by extending through and/or filling in openings, slots, grooves, or other structures in the base member.

Golf club heads in accordance with examples of this invention may include still additional features, if desired, including features that are known and used in the art, such as one or more weight elements. The weight elements, when present, may be permanently mounted to the base member and/or the polymeric body member, e.g., on an interior or exterior of the club head body, extending from the exterior to the interior of the club head body (e.g., through a weight port), etc. As yet additional examples, if desired, the weight member(s) may be movably and/or removably mounted with respect to the club head base member and/or the polymeric body member, e.g., using structures and techniques that are known and used in the art (e.g., by screw or other mechanical connector attachments, by sliding attachments, etc.). Advantageously, in accordance with at least some examples of this invention, the weight element(s) will be located at or proximate to a rear of the club head body portion, optionally toward the rear toe, the rear heel, and/or the rear sole portions of the club head. If desired, the weighted portion(s) or member(s) may be selectively movable and/or removable from the club head body and/or mountable in a variety of different positions and/or arrangements, e.g., to allow customization, interchange, replacement, and/or club-fitting (e.g., to provide a draw biased club, to provide a fade biased club, to provide a high trajectory biased club, to provide a low trajectory biased club, to provide a club to help compensate for undesired ball flights or swing flaws (e.g., to help correct hooks, slices, etc., to help get balls airborne, to help prevent ballooning ball flights, etc.), etc.).

The club head base member may be made from a wide variety of materials and parts without departing from this invention, including in conventional ways, from conventional materials and parts, as are known and used in the art. In some more specific examples, the club head base member may be made from one or more of: metal materials (e.g., metals or metal alloys, such as alloys containing steel, titanium, magnesium, aluminum, etc.); composite materials (e.g., carbon fiber composites, basalt fiber composites, etc., for a crown portion, a skirt portion, a sole portion, an aft body portion, a ball striking face portion, etc.); polymeric materials; etc. Examples of suitable materials for the polymeric body member formed by rotational molding (or other centrifugal force based molding techniques) include: polyethylene materials (including low, medium, or high density polyethylene, linear low density polyethylenes, ethylene-vinyl acetates, and ethylene-butyl acrylates); polyvinylchlorides and polyvinylchloride plastisols; nylons or other polyamides; polypropylenes; and the like.

The polymeric body member need not be engaged with the golf club head base member through the actual rotational molding process in all examples of this invention. Rather, if desired, the polymeric body member may be separately produced from the club head base member by rotational (or other centrifugal force based) molding techniques, and then attached to the separately formed base member (e.g., by cements or adhesives, mechanical connectors, etc.). If necessary, after molding, the polymeric body member(s) may be cut, trimmed, or otherwise formed and/or finished into a desired shape and/or form for attachment to the base member. As another example, if desired, the exterior surface(s) of the polymeric body member(s) may be partially or completely coated with a metal-containing material, such as a metal or metal alloy (e.g., of materials known and conventionally used in golf club head construction, such as those mentioned above). The metal coating or layer, when present, can be useful, for example, to allow the polymeric portion of the club head structure to be finished in a manner similar to the other metal based portions of the club head structure.

Additional aspects of this invention relate to golf club structures that include golf club heads, e.g., of the types described above (such as wood-type golf clubs including drivers, fairway woods, wood-type hybrid or utility clubs, etc.). In addition to club head structures of the types described above, golf clubs according to at least some examples of this invention may include one or more of: (a) a shaft member engaged with the club head body (e.g., with the base member, the polymeric body member, or both); (b) a grip member engaged with the shaft, and/or (c) a handle member engaged with the club head and/or the shaft. These additional elements of the golf club structure may be included in the overall club structure in any desired manner without departing from this invention, including in conventional manners that are known and used in the art (e.g., the shaft may be engaged via an external hosel member, via an internal hosel member, through an opening provided in the club head, via adhesives, via mechanical connectors (e.g., threads, retaining elements, etc.), etc.). Additionally, these additional elements of the golf club structure may be made from conventional materials, in conventional constructions, e.g., as are known and used in the art. If desired, one or both of the club head base member and/or the polymeric body member may be formed to include a hosel element, or if desired, a hosel element of some type may be engaged with one or more of the base member and/or the body member (e.g., interior, exterior, or both, with respect to the overall club head structure).

B. General Description of Example Methods of Making and/or Using Golf Club Heads and Golf Clubs According to the Invention Additional aspects of this invention relate to methods of making golf club heads and/or golf club structures in accordance with this invention (e.g., of the various types described above). Such methods may include, for example: (a) engaging a golf club head base member with at least a portion of a mold, wherein the base member includes at least a portion of a golf club head face member (and optionally, at least a portion of a sole member, a skirt member, a crown member, an aft body member, a frame member, a hosel member, etc.); (b) placing a material for forming a portion of a golf club head body member into at least a portion of the mold; and (c) moving the mold with the material therein and with the golf club head base member engaged therewith to position the material at one or more desired locations with respect to the golf club head base member (e.g., at a crown portion, at a skirt portion, at a sole portion, as an aft body portion, to cover a frame member, etc.). Alternatively, in some examples of this invention, the rotationally (or otherwise formed) molded part will be formed separate from the golf club head base member and then engaged with the golf club head base member, e.g., by adhesives or cements, by mechanical connectors, etc. Optionally, if necessary, the molded part may be cut, trimmed, coated with a metal material, and/or otherwise finished, e.g., prior to and/or after engagement with the club head base member.

If desired, in accordance with at least some examples of this invention, the material for forming the portion of the club head body member will not adequately form the club head body member when initially placed in the mold (e.g., because it is in a pelleted, powder, or other solid condition), but it may be modified while in the mold (e.g., by heating it to make it more flowable and/or to liquefy it, by moving it while in the flowable form (e.g., under centrifugal force), etc.) to thereby place the material in the desired and necessary positions for forming the remaining portions of the overall club head body. After the material is positioned with respect to the golf club head base member (e.g., flowed to and held at the desired positions, such as via rotational or centrifugal forces), the material may be cooled (optionally while rotation continues) to fix it in place with respect to the club head base member and/or the mold.

In accordance with at least some examples of this invention, the material for forming a portion of the club head body member will be positioned with respect to the base member by a rotational process, e.g., by rotational molding (optionally by rotating the mold about at least a first axis of rotation, optionally about at least two axes of rotation (that may be perpendicular to one another). The rotation about the two (or more) axes (when conducted) may take place simultaneously.

Golf clubs according to at least some examples of this invention may be produced by engaging a shaft member and/or handle member with the club head body (e.g., of the types described above). This may be accomplished in any desired manner, including in conventional manners that are well known and used in the art (e.g., via cements or adhesives, via mechanical connectors, etc.). Additionally, if desired, a grip element may be engaged with the shaft or handle member, e.g., in any desired manner, including in manners that are well known and used in the art (e.g., via cements or adhesives, via mechanical connectors, etc.). Golf club heads and golf clubs in accordance with this invention may be used in conventional ways as also are known in the art.

Specific examples of the invention are described in more detail below. The reader should understand that these specific examples are set forth merely to illustrate examples of the invention, and they should not be construed as limiting the invention.

C. Specific Examples of the Invention

FIGS. 1 through 5 illustrate example golf club and golf club head structures in accordance with this invention. When the same reference number appears in more than one drawing, that reference number is used consistently in this specification and the drawings to refer to the same or similar parts throughout.

Example golf club and golf club head structures in accordance with this invention may constitute "wood-type" golf clubs and golf club heads, e.g., club heads typically used for drivers and fairway woods, as well as for "wood-type" utility or hybrid clubs, or the like. Aspects of this invention, however, also may be used in producing putters, chipping clubs, and/or other golf club heads and/or golf club structures. More specific examples and features of golf club heads and golf club structures according to this invention will be described in detail below in conjunction with the example golf club structures illustrated in FIGS. 1 through 5.

FIG. 1 generally illustrates a wood-type golf club 100 in accordance with one example of this invention. The golf club 100 includes a golf club head 102 having a multi-part construction (as will be described in more detail below) and a hosel area 104 at which the head 102 is connected to a shaft 106. The hosel area 104 may be of any desired design and construction without departing from this invention (e.g., an exteriorly extending hosel member 104, as shown; an internal hosel member; a releasable hosel member; etc.), including conventional designs and constructions as are known and used in the art. Likewise, the shaft 106 may be made of any desired materials and connected to the hosel area 104 (or directly to the club head 102) in any desired manner, including conventional materials, connected in conventional manners, as are known and used in the art. As some more specific examples, if desired, the shaft 106 may be made from steel, aluminum, or other metal or metal alloy materials; graphite based materials; composite materials; etc. The shaft 106 may be connected to the hosel area 104 and/or directly to the club head 102 via cements or adhesives, via mechanical connection systems, and the like. If desired, the shaft 106 may be connected to the hosel area 104 or to the club head 102 by a releasable mechanical or adhesive connection that easily allows the club head 102 and shaft 106 to be separated from one another (and optionally thereafter engaged with a different head or shaft).

A grip member 108 or other handle element may be provided on and/or integrally formed with the shaft 106. Any desired materials may be used for the grip member 108, such as rubber based materials (synthetic or natural); polymer based materials (including cord or other fabric or textile containing polymers); leather materials (synthetic or natural); etc. The grip member 108 or other handle element may be engaged with or formed as part of the shaft 106 in any desired manner without departing from this invention, including through the use of adhesives or cements, mechanical connectors (e.g., threaded connections), or the like. In at least some example structures according to this invention, the grip member 108 will be made of conventional materials as are known and used in the art, and it will be attached to the shaft member 106 in conventional manners as are known and used in the art.

FIG. 1 generally illustrates an example multi-part golf club head structure 102 in accordance with this invention. In this illustrated example, the golf club head 102 includes a sole member 102a integrally formed with a face component 102b, which includes a ball striking face (e.g., integrally formed as part of the overall face component 102b, as a separate component attached to a face base member, etc.). The sole member 102a and the face component 102b may be formed together as one part (e.g., by casting or molding procedures), e.g., from a metal alloy material, such as an aluminum alloy, a titanium alloy, a steel material, a magnesium alloy, a beryllium alloy, etc. The sole member 102a and the face component 102b also may be made as separate parts that are joined together (e.g., by welding, mechanical connectors, adhesives, cements, etc.), and they may be made from the same or different materials without departing from this invention. In at least some examples, the sole member 102a and the face component 102b will be made from conventional metal alloy materials as are known and used in the art.

Additional components of the example golf club head structure 102 are illustrated in FIG. 1. Specifically, the club head structure 102 of FIG. 1 further includes one or more body components 102c that form the base body of the club head 102 (e.g., U-shaped or C-shaped ribbons of material that extend around the rear of the club head 102 and from the face component 102b's heel edge to its toe edge). These body components 102c may be made from any desired materials and connected with the sole member 102a and/or the face component 102b in any manner without departing from this invention, including from conventional materials (e.g., metal alloys, like those described above for sole member 102a; composite materials, including carbon fiber or other fiber reinforced materials, etc.; polymeric materials; etc.) and via conventional connections, as are known and used in the art. Alternatively, if desired, one or more of the body components 102c may be integrally formed with the sole member 102a and/or the face component 102b, e.g., during the same overall forging, casting, molding, or other procedure(s). In still other examples, the body member 102c will be integrally formed with the crown member 102d by a rotational or centrifugal molding process, as will be described in more detail below.

The crown member 102d in this illustrated example is made from a polymeric material, formed in a rotational molding or other centrifugal force based molding process. Any desired portion of an overall club head structure 102 may be made using rotational molding or other centrifugal force based molding processes, such as a portion of the crown 102d, the entire crown 102d, the crown 102d and at least some portion of the body component(s) 102c, the crown 102d, body 102c, and the sole 102a, etc. As yet another example, if desired, the entire head 102 (optionally with hosel 104) may be formed by rotational or other centrifugal force based molding processes. Various example structures will be described in more detail below.

One advantageous feature realized in using rotational molding (or other centrifugal force based molding processes) in producing at least the crown portion 102d lies in the fact that the crown portion 102d (and optionally other portions of the club head structure 102) may be made from very lightweight and strong polymeric materials, which frees the club maker to selectively place more weight in other desired locations on and/or in the club head body (e.g., toward the rear and away from the center line of the club head body or other locations (to increase club head moment of inertia); to affect ball flight (high flight v. low flight, high spin v. low spin, etc.); to bias the club head to produce specific ball flights and/or help compensate for various swing flaws (e.g., to create a draw biased club, to create a fade biased club, to help compensate for swing flaws of chronic slicers, to help compensate for swing flaws of chronic hookers, etc.); etc. Any desired club head shape also may be formed by these processes without departing from this invention (e.g., conventional "rounded" shapes, square or rectangular shaped, etc.).

Any desired materials may be used for the crown member 102d (and/or other portions of the club head body 102 produced by rotational or other centrifugal force molding techniques) without departing from the invention, including conventional polymeric materials having sufficient strength and other suitable properties for use in a golf club head structure. Examples of such materials include, but are not limited to: polyethylene materials (including low, medium, or high density polyethylene, linear low density polyethylenes, ethylene-vinyl acetates, and ethylene-butyl acrylates); polyvinylchlorides and polyvinylchloride plastisols; nylons or other polyamides; polypropylenes; and the like.

An example rotational molding process in accordance with this invention now will be described in more detail in conjunction with FIGS. 2A through 2D.

Figure 2A:
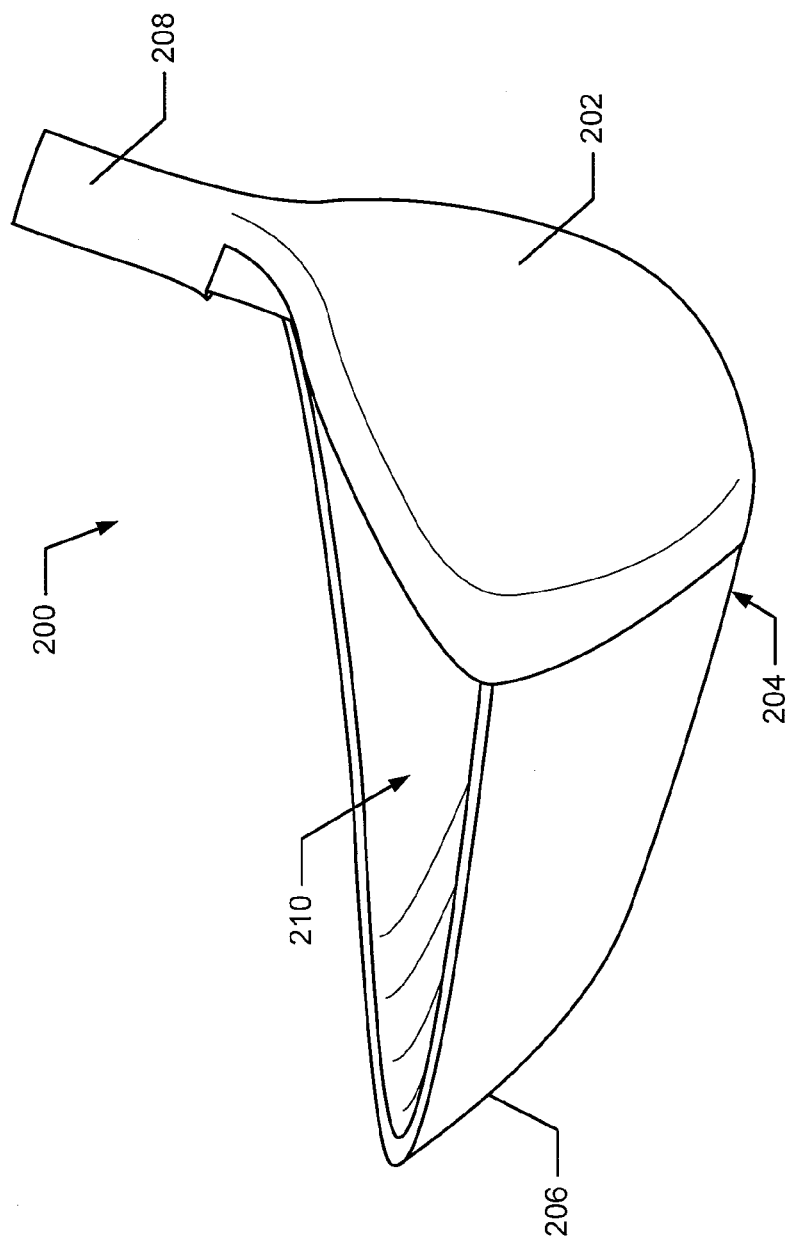
FIGS. 2A through 2D illustrate an example rotational molding process in accordance with this invention.

In this example procedure, first, a golf club head base member is obtained or produced. This golf club head base member forms a portion of the basic structure of the final golf club head product, such as the club head face member (optionally with a ball striking face attached thereto or integrally formed therewith, a "cup face" structure, etc.), a sole member, and/or at least a portion of a body member. FIG. 2A illustrates an example golf club head base member 200 that may be used in some example processes in accordance with this invention. This golf club head base member 200 includes an integrally formed (e.g., forged, casted, etc.) club head face component 202 (optionally in the general form of a "cup face" member), a sole portion 204, a body member 206, and a hosel member 208. As shown in FIG. 2A, the various parts of this example club head base member 200 define a hollowed out interior 210, which helps provide a lightweight overall club head structure.

While the entire golf club head base member 200 may be integrally formed as a unitary one-piece construction, if desired, prior to the molding process, these various parts could be separately produced from one another and joined to one another, e.g., by conventional techniques, such as via welding, brazing, or other fusing techniques; via cements or adhesives; via mechanical connectors; etc. The golf club head base member 200 (and/or its individual parts) may be made of any desired materials without departing from this invention, including, for example, metal or metal alloy materials of the types described above (including titanium, titanium alloys, aluminum, aluminum alloys, steel materials, etc.).

Figure 2B:
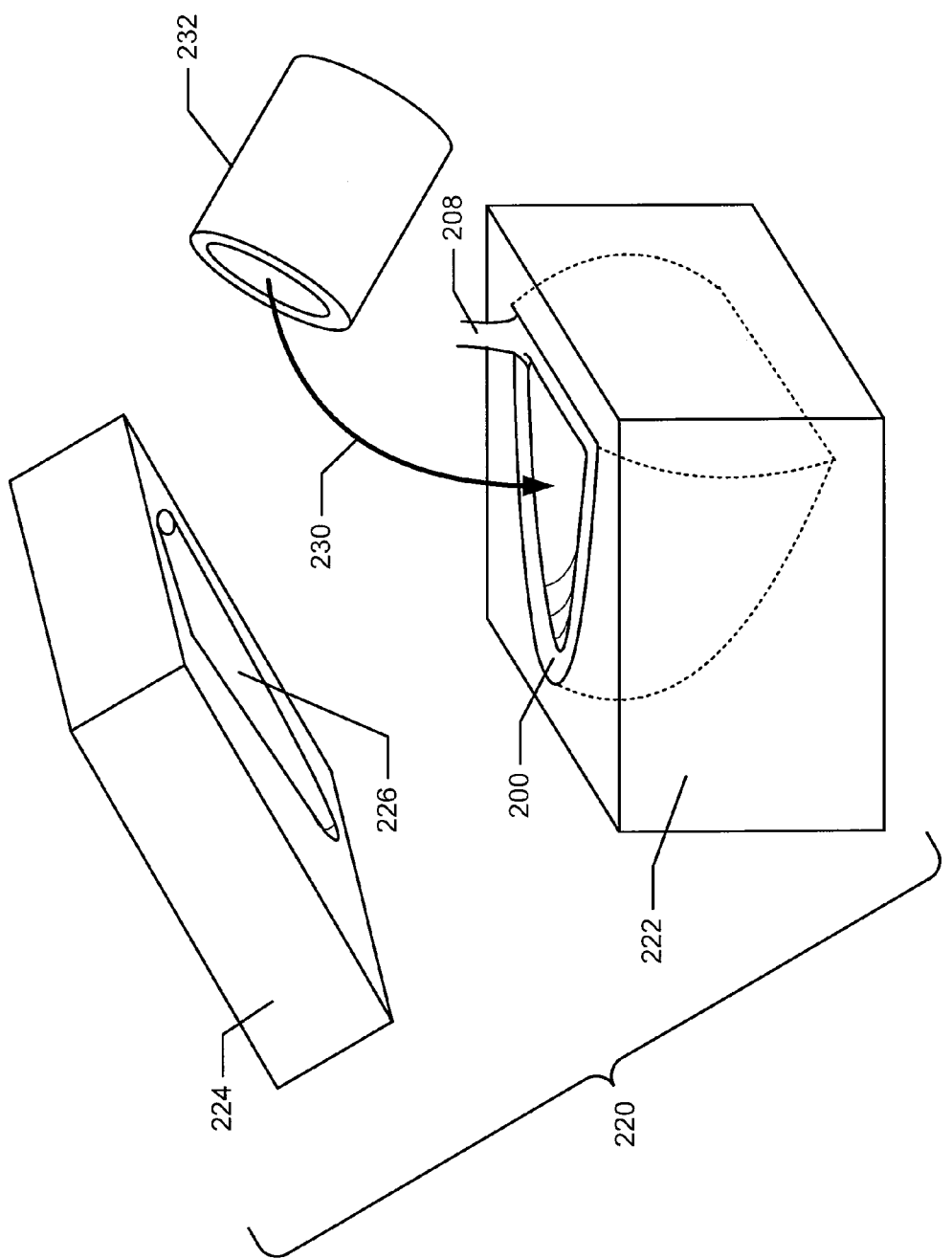

Once the golf club head base member 200 has been provided (e.g., produced, obtained from a third party, etc.), it may be placed into one portion 222 of a mold 220, as shown in FIG. 2B. The interior surface of mold portion 222 may be formed so as to closely correspond to at least some portions of the exterior surfaces of the golf club head base member 200, e.g., such that no molten or otherwise flowable polymeric material will flow between the mold portion 222 walls and at least some portions of the golf club head base member 200. In this manner, at least some portions of the golf club head base member 200 will form an exterior of the finally molded golf club head product. If necessary or desired, any polymeric material that undesirably covers an exterior surface of the golf club head base member 200 after the molding process may be removed.

After the golf club head base member 200 is positioned in the mold portion 222, the desired polymeric material for forming the crown and/or other portion(s) of the final club head body structure may be added to the mold portion 222. Other materials also may be added, if necessary or desired (e.g., catalysts, pigments, initiators, cross-linking agents, other reactants, etc.). This step is represented in FIG. 2B by arrow 230 extending from a polymeric supply 232 into the interior of mold portion 222, thereby indicating introduction of polymeric material (and/or other materials) into the mold portion 222. Advantageously, if desired, a relatively precise amount of polymer material will be introduced into the mold portion 222 so as to produce the desired part of the club head body, of the desired thickness, without adding excess weight to the overall club head structure. While the polymeric material may be added into the mold portion 222 in any desired form without departing from this invention (e.g., solid, liquid, combination, as precursors or reactants, etc.), in at least some example procedures in accordance with this invention, the polymeric material will be added as a solid, optionally in powdered or pelleted form. Once the necessary materials (e.g., polymer powder, etc.) have been added to the mold portion 222, the entire mold 220 may be assembled, e.g., in this example by attaching the mold portion 224 to mold portion 222. Alternatively, if desired, the mold portions 222 and 224 may be engaged together first and the necessary materials (e.g., polymer powder, etc.) may be introduced into the assembled mold 220 through a port provided in one or more of the mold portions 222 and/or 224. Other arrangement(s) of steps are possible without departing from this invention. As shown in FIG. 2B, mold portion 224 includes a hollowed out area 226, the interior surface of which forms the desired shape of the final club head product.

If desired, some portion of the club head base member 200 may extend above the top of mold portion 222 and may be received within mold portion 224. Also, if desired, the club head base member 200 need not extend all the way to the top surface of mold portion 222 (e.g., the interior surface of mold portion 222 also may be shaped to form at least some portion of the desired polymeric body member). The mold 220 also may be made from more than two pieces or portions, if desired.

Figure 2C:
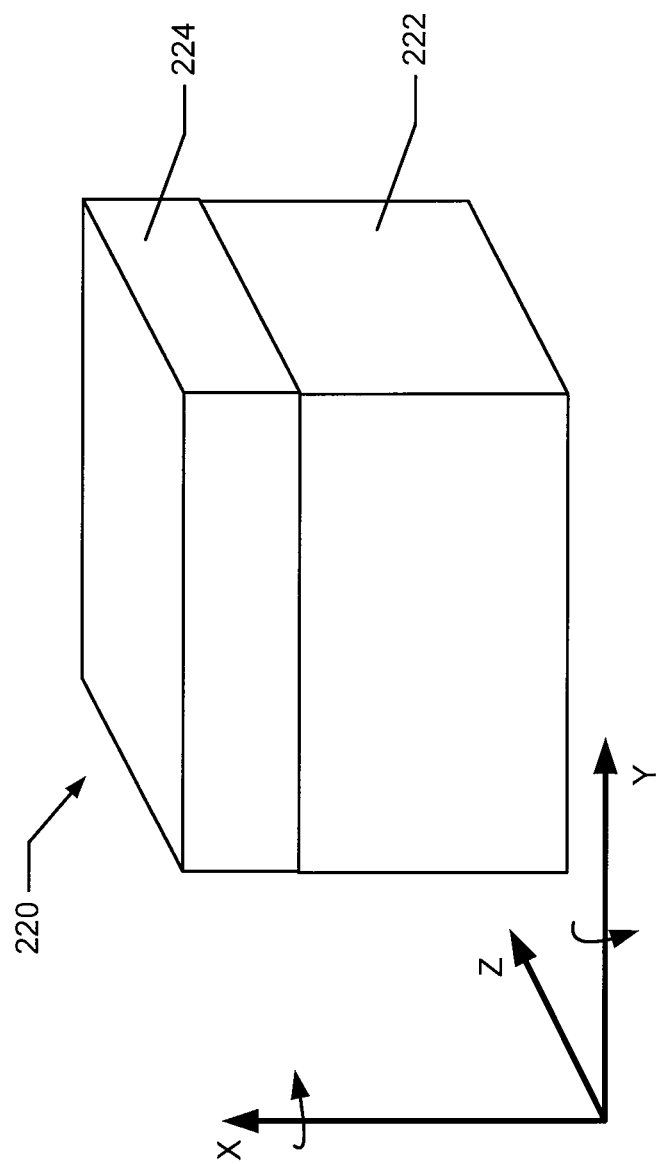

Once fully assembled, as shown in FIG. 2C, the mold 220 then is rotated and heated (if heating is necessary to cause the polymeric material to flow and/or to cause any necessary polymer forming reaction to occur). In accordance with at least some examples of this invention, rotation may take place simultaneously about two axes (e.g., the "X" axis and the "Y" axis in the example illustrated in FIG. 2C). These steps cause the polymeric material to flow toward and form a shell against all interior surface(s) to which it is exposed (e.g., against the inside of the club head body member 200 or against the interior surface (e.g., 226) of the mold portion 224). While it may do so, the polymeric material need not change to a liquid state in order to flow to the desired locations under the applied centrifugal force in the process (e.g., the powdered or pelleted solid material may adequately "flow" to all desired locations under the force of the rotation). As the mold is further heated, and while the rotation continues, polymeric material in contact with the mold walls and/or the metal part eventually reaches a "tack" point and starts sticking to the mold walls and/or to the metal part. While simultaneous rotation about two perpendicular axes is described, other arrangements are possible e.g., rotation about a single axis, simultaneous rotation about two non-perpendicular axes, etc.

Figure 2D:
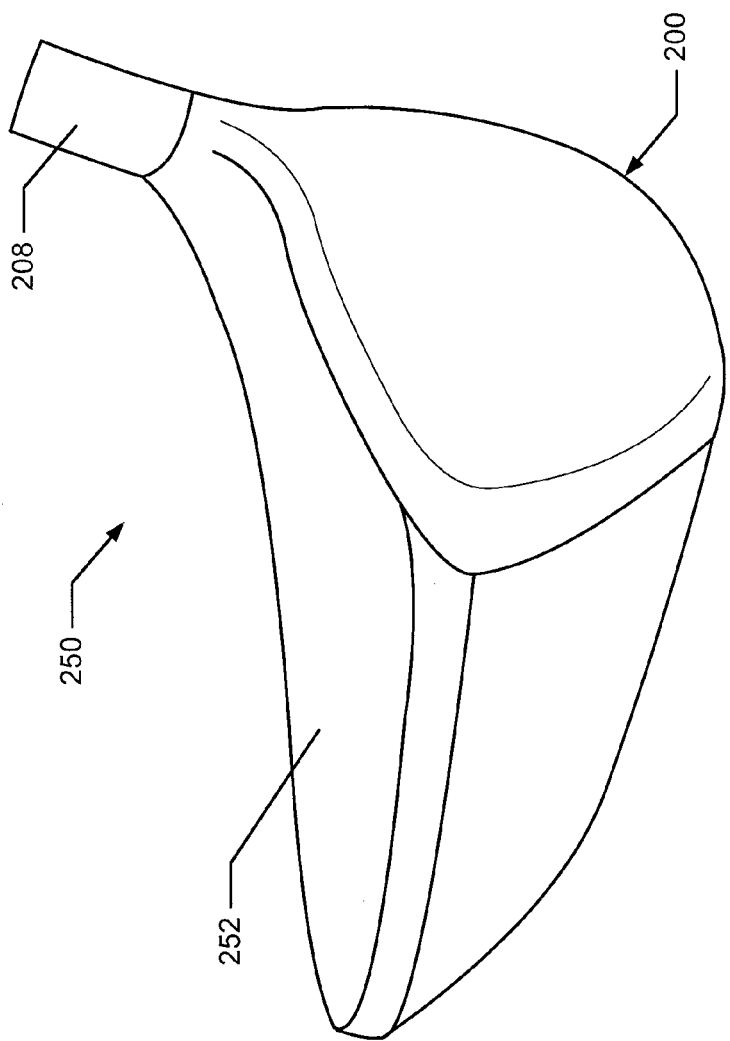

Once the molding is completed, the mold 220 may be allowed to cool (optionally, with continuing rotation, if necessary). Cooling generally causes the metal and polymer parts to contract somewhat, which can make removal of the golf club head from the mold 220 somewhat easier by pulling these elements away from the interior mold walls. FIG. 2D illustrates the molded golf club head product 250, including the base golf club head body member 200 and the rotationally molded polymeric crown portion 252. Once cooled, any excess powder or pellets included within the club head 250 may be emptied out (if desired), e.g., through the hosel member 208 and/or through any other port(s) provided in the overall club head structure 250. Also, if necessary or desired, final club head finishing or preparation steps may be completed, such as trimming off excess polymer, grinding of excess metal or polymer, anodizing, chromation, painting, coating, etc., including various finishing techniques as are known and used in the art.

Many variations in the molding procedure may be performed without departing from this invention. For example, the heating temperature, rotational speed, materials for use, and/or amounts of the materials in the processes described above may be readily selected and/or determined by those skilled in the art, e.g., through the use of routine experimentation. As another example, if desired, creation of an entire interior layer of the polymer material during the rotational molding procedure may be avoided. For example, if the polymeric material tends to strongly adhere to the base golf club head body member 200, if desired, at least some portions of the interior surface of the base golf club head body member 200 may be coated with a material or otherwise treated such that adherence with the tacky polymeric material is inhibited (sufficient portions of the interior surface of the golf club head body member 200 may be left uncoated or untreated so as to provide sufficient overall engagement of the crown portion 252 with the remainder of the base golf club head body member 200). As another example, if the polymeric material does not tend to adhere to the base golf club head body member 200, then at least some portions of the interior surface of the base golf club head body member 200 may be coated with a material or otherwise treated such that adherence with the tacky polymeric material will be promoted, so as to allow stable attachment of the base golf club head body member 200 with the crown portion 252. As still additional examples, if desired, once the mold is opened, the fully formed interior layer of polymeric material may be removed from the base golf club head body member 200, the excess polymeric material may be trimmed away, and the final crown portion 252 then may be engaged with the base golf club head body member 200 in any desired manner, e.g., using cements or adhesives; mechanical connectors; etc.

After the crown portion 252 is fully engaged with the base golf club head body member 200 (or at any other desired time in the overall process), further processing may be performed on the club head. For example, the overall club head product may be painted, finished, etc; additional parts may be added, such as medallions, logos, or other identifiers; weight members (optionally removable weight members, etc.) may be added; shafts may be added; additional grinding or the like may take place; etc.

As mentioned above, if desired, all or some desired portion or portions of the polymeric portion of the final golf club head structure (e.g., all or part of crown portion 252 in golf club head structure 250 of FIG. 2D) may be coated or layered with a metal or metal-containing material (e.g., a metal or metal alloy material, such as metal or metal alloy materials conventionally known and used in golf club head construction, like those described above). Any desired manner of coating or layering the polymeric material with a metal or metal-containing material may be used without departing from this invention, including conventional manners as are known in the art. As some more specific examples, if desired, a thin metal material may be included in or applied to the polymeric material structure using the techniques described in U.S. Patent Application Publication No. 2006/0135281 A1 and/or PCT Patent Publication No. 2006/066010 A2 (U.S. Patent Application Publication No. 2006/0135281 A1 and PCT Patent Publication No. 2006/066010 A2 each are entirely incorporated herein by reference). Of course, other metal coating, layering, or application techniques may be used without departing from this invention. Inclusion of a metal layer may be useful, for example, to enable the polymeric portion of the club head to be finished and/or otherwise appear integrally formed with or seamlessly engaged with the metal portion of the club head structure.

As yet another option or alternative, if desired, the crown portion 252 (or other desired portions of the overall club head body) may be formed in a rotational molding process (or other centrifugal force inducing molding processes) without directly including the base golf club body member 200 in the mold. In other words, the crown portion 252 (and/or other desired portions of the overall club head body) may be formed by rotational molding (or other centrifugal force inducing molding processes) and then engaged to a separately formed base golf club head body member 200 and/or other separately formed club head parts, e.g., using cements or adhesives; mechanical connectors; etc.

Golf club head and/or base golf club head body members may take on a wide variety of different forms without departing from this invention. FIGS. 3A and 3B illustrate another example. FIG. 3A illustrates a base golf club head body member 300 having a face portion 302 (including a ball striking face) and an aft portion in the form of a frame member 304 with plural open cells 304a. The frame member 304 may be integrally formed with the face member 302 (e.g., casted from a metal alloy material), or they may be separate parts engaged together in any desired manner (e.g., welding or other fusing techniques, mechanical connectors, adhesives, etc.). Any number of open cells 304a may be provided in the frame member 304, of any desired sizes, without departing from this invention, and the open cells 304a may be provided on any desired surface(s) and/or over any desired portion(s) of the frame member 304 (e.g., on the sole portion, on the crown portion, on the intermediate body portion (between the crown and sole), etc.). As additional examples, if desired, the open upper surface of the base golf club head body member 200 of FIGS. 2A through 2D may be changed to include a frame member of the type illustrated in FIGS. 3A and 3B and/or the sole and/or body portion(s) of the base golf club head body member 200 of FIGS. 2A through 2D may be modified to include one or more open areas.

A final golf club head structure 350 may be produced using this base club head body member 300, e.g., in the manner generally described above in conjunction with FIGS. 2A through 2D. FIG. 3B shows an example final molded golf club head structure 350. As shown, the final molded golf club head structure 350 includes an aft polymeric body 310 engaged with the frame member 304, e.g., through the rotational molding procedure described above. In this illustrated example, the polymeric body 310 forms the entire exterior of the club head 350 rearward of the return portion 302a of the face member 302 (optionally covering all or some portion of the sole), and the frame 304 underlies the aft polymeric body 310. Alternatively, if desired, the frame 304 may be contained or embedded within the aft polymeric body 310 after the rotational molding procedure is completed (i.e., sufficient polymer material may be present such that polymeric material extends through openings 304a and covers both the interior and exterior of the arms of the frame 304). This feature provides strong engagement between the polymeric aft body 310 and the remainder of the club head structure 350. If desired, a significant portion of the sole of the club head may remain exposed metal alloy of the face component 302, return portion 302a, and/or frame member 304, to thereby provide a very strong, stable, and wear resistant sole. Additionally or alternatively, if desired, all or some portion(s) of the polymeric body member 310 may be coated or layered with metal material, e.g., as described above.

Figure 4A:
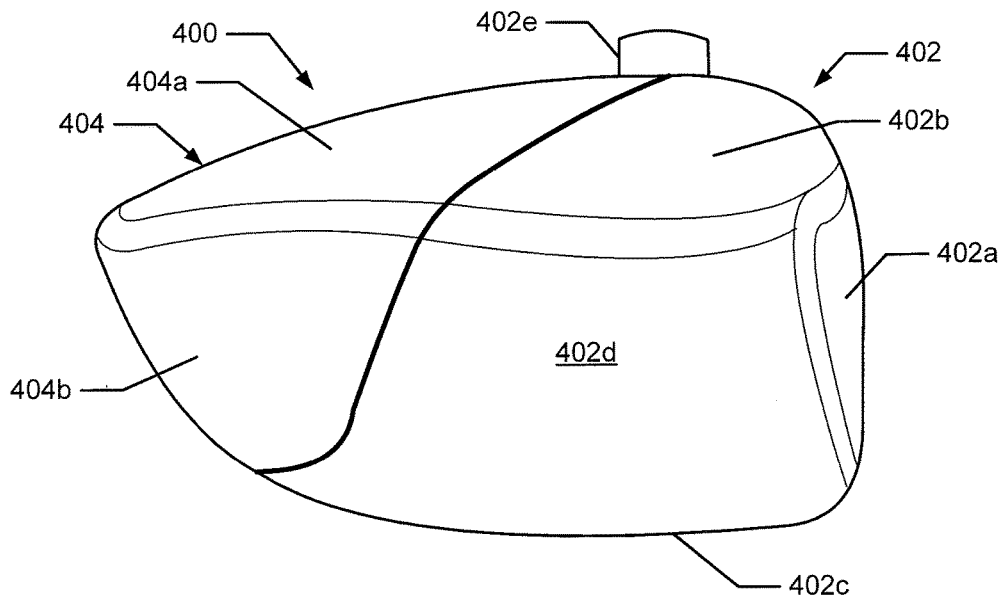
FIGS. 4A and 4B illustrate additional features of another example golf club head structure in accordance with this invention.
Figure 4B:
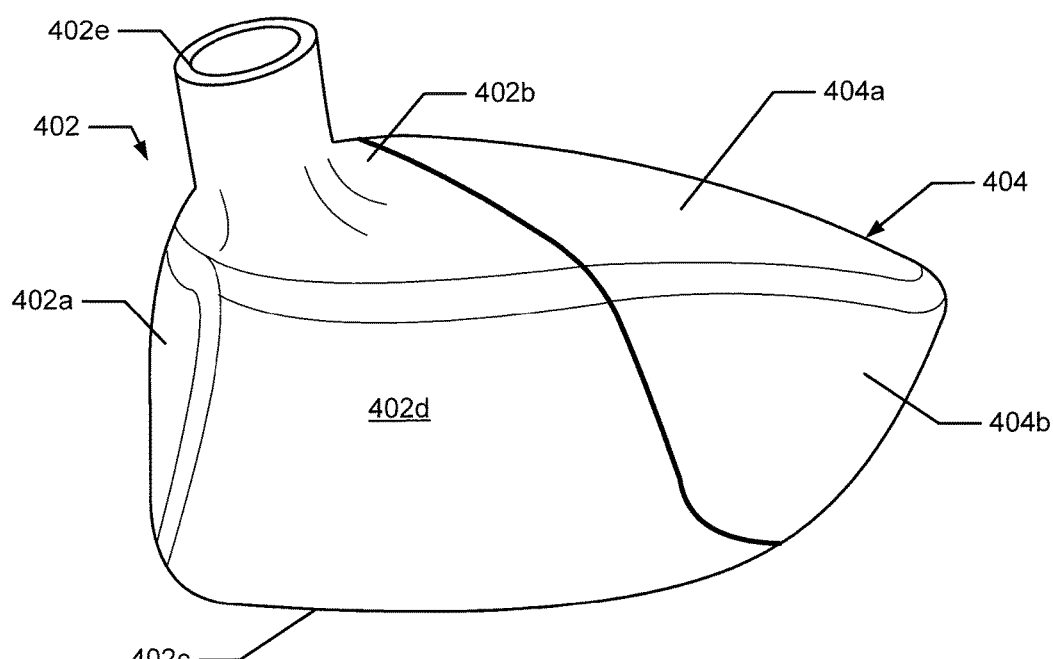

FIGS. 4A and 4B illustrate another example club head structure 400 (toe view in FIG. 4A, heel view in FIG. 4B) that may be produced by rotational molding processes in accordance with examples of this invention. In this illustrated example club head structure 400, the base golf club head body member 402 (which may be made from one or more individual pieces or parts) forms the face 402a, a portion of the crown 402b, the sole 402c, a portion of the body member 402d, and the hosel area 402e. The polymeric rotational molded club head body portion 404 in this illustrated example forms a portion of the crown 404a and a portion of the body 404b of the club head 400, more specifically, forming the top and rearmost portions of the overall club head structure 400. If desired, at least some portions of the base golf club head body member 402 (or some other structure in the golf club head 400) may provide a frame member of the type illustrated and described above in conjunction with FIGS. 3A and 3B that extends rearward and underlies and/or is embedded in at least some parts of the polymeric portion 404.

Figure 5:
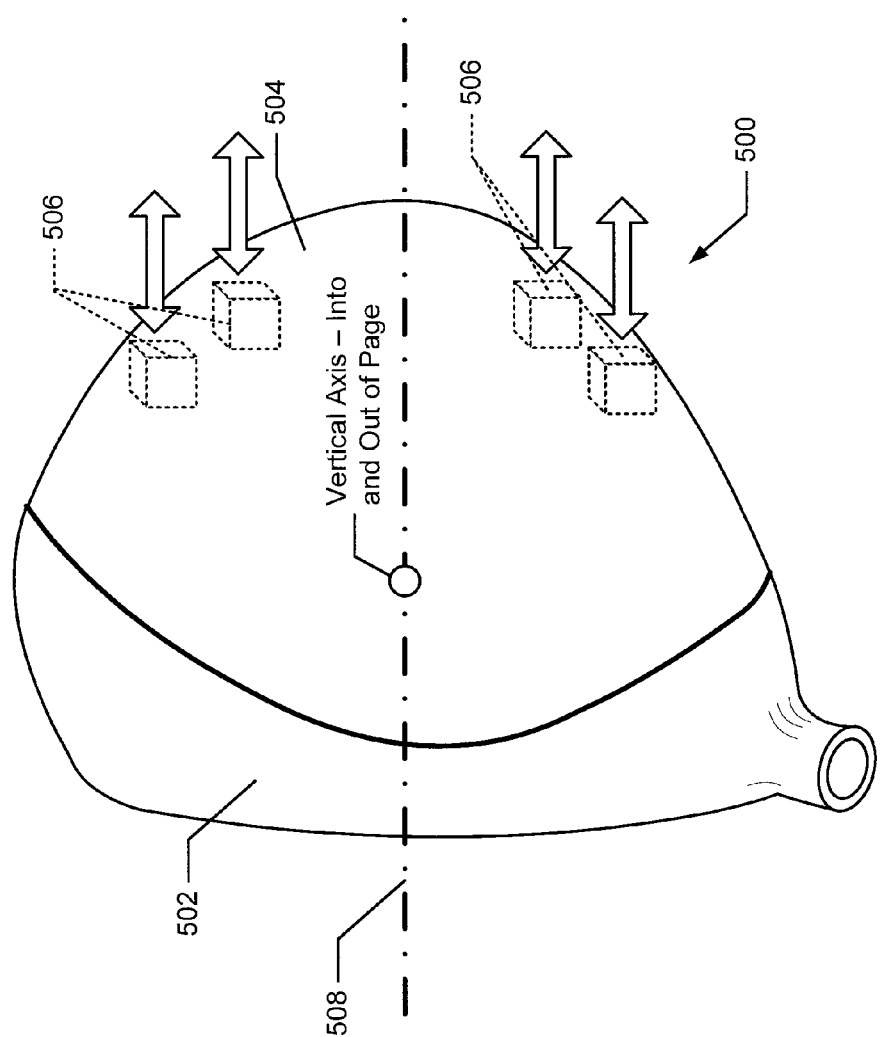
FIG. 5 illustrates example weighting features that may be used in golf club heads in accordance with this invention.

As mentioned above, one advantage of the use of rotational (or other) molding processes in accordance with examples of this invention lies in the fact that lightweight polymer materials can be used in golf club head structures. The reduction in weight realized through the use of polymeric materials (e.g., as compared to corresponding parts made from metal alloy or other conventional materials, etc.) can "free up" weight that club designers can place at other strategic locations in the club head structure, e.g., to affect ball flight or spin characteristics, to bias the club for specific types of ball flights (e.g., high flight bias, low flight bias, hook bias, draw bias, etc.), and/or to help compensate for user's swing faults. FIG. 5 illustrates an example club head structure 500. In this example club head structure 500, at least some portions of the front, body, and sole of the club head structure 500 are made from a metal alloy material 502 (e.g., a titanium alloy) and the crown portion 504 is made from a polymeric material through a rotational molding process, e.g., like the club head and processes described above in conjunction with FIGS. 2A through 2D. One or more weight members 506 are provided in the club head structure 500.

The weight members 506 may be provided at various positions to selectively alter the moment of inertia, center of gravity, and/or other characteristics of the golf club head, which features can affect the club head's playability and the ball flight characteristics of a ball propelled by the club head. For example, weight members 506 provided and/or concentrated generally low (toward the sole) in a club head structure generally will help propel the ball on a higher trajectory and better help players get a ball airborne. Weight members 506 provided and/or concentrated generally higher in a club head structure (e.g., more toward the crown) have the opposite effect, i.e., they generally tend to help propel the ball lower, with a more boring flight path (which can help golf shots better cut through the wind). Weight located and/or concentrated outward in each direction away from the club head's center line 508 generally helps increase the moment of inertia of the club head about the vertical axis at the club head's center of gravity (e.g., Izz), which feature can help user's better propel the ball straight (e.g., this feature reduces club head twisting during off center (heel or toe) hits). Concentrating more weight toward the club head heel as opposed to its toe can bias the club to propel the ball with more of a "draw" flight path (i.e., right-to-left for right handed players) and can help chronic slicers compensate for swing flaws (and thereby have a better chance of avoiding a slice). Concentrating more weight toward the club head toe as opposed to its heel, on the other hand, can bias the club to propel the ball with more of a "fade" flight path (i.e., left-to-right for right handed players) and can help chronic hookers compensate for swing flaws (and thereby have a better chance of avoiding a hook).

Of course, the weight(s) 506 may be provided in the overall club head structure 500 in any desired manner without departing from this invention. For example, if desired, prior to the rotational molding process described above, weight may be permanently mounted in desired locations in the interior of the base golf club head body member (e.g., element 200). As another example, if desired, one or more weights may be mounted in weight ports provided in or on an exterior surface of the base golf club head body member (e.g., element 200), optionally in a removable manner (e.g., threaded weights mounted in threaded ports so that users, club fitters, or the like can freely move the weights (optionally of different masses) to desired locations on the club head to better fit the club head's weighting characteristics to the user's swing and/or desired ball flight characteristics). Other weighting techniques (both permanent, movable, and/or removable) may be used without departing from this invention, including conventional weighting techniques as are known and used in the art.

Features of this invention may be used for producing a wide variety of wood-type golf club head structures. While driver type structures generally have been described above in detail and illustrated in the attached drawings, other types of club head structures that may be produced in accordance with at least some examples of this invention include: fairway woods (e.g., 2 through 13 woods), wood-type "hybrid" or utility clubs, putters, chipping type clubs, and the like. For example, in any and/or all of the various club types described above, rotational molding or other centrifugal force based molding techniques may be used to create crown portions and/or other portions of the club head body structure, optionally from polymeric materials.

The driver or other club heads may have any size and/or dimensional characteristics without departing from this invention, including conventional size and/or dimensional characteristics for wood-type and other golf clubs and golf club heads as are known and used in the art. The rotational molding techniques gives club designers great degrees of freedom in designing club head shapes, contours, and the like. When used to make driver or other wood type golf club structures, golf club heads in accordance with at least some examples of this invention may have an overall club head breadth B dimension (maximum front face to rear dimension) of at least 4.2 inches, at least 4.4 inches, at least 4.5 inches, at least 4.6 inches, or even or at least 4.8 inches. Club head body structures in accordance with this invention further may have an overall club head length dimension L (maximum heel to toe dimension) of at least 4.5 inches, at least 4.7 inches, or even at least 4.8 inches. The club head shape and/or structure may be controlled, at least in part through the rotational molding process, such that the overall club head body size is 500 cm$^3$ or less, 470 cm$^3$ or less, or even 460 cm$^3$ or less. In at least some examples, the overall club head body size or volume will be at least 350 cc, at least 400 cc, at least 420 cc, or even at least 450 cc.

Rotational molding processes also can avoid some of expense and time consuming disadvantages of forming carbon fiber composite parts, internal bladder molding processes associated with producing carbon fiber composite parts, etc. In general, rotational molding techniques in accordance with examples of this invention can expand the range of polymeric materials available for use in golf club manufacture and is more cost effective than may traditional and conventional molding techniques.

Many modifications to the overall club head structures and/or the overall golf club structures may be made without departing from this invention. For example, many modifications may be made to the part or parts making up the club head structure, to the materials used in making the club head structure, to the manner in which the club head structure is joined together, etc. Also, many modifications may be made to the thickness, weight, shape, size, and/or other physical characteristics of the part or parts making up the overall golf club structure, etc.

CONCLUSION

While the invention has been described in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

We claim:

1. A golf club head, comprising:
a golf club head base member including a face portion and an aft portion integrally formed or engaged with the face portion,
wherein an exterior surface of the golf club head base member steps inward between the face portion and the aft portion, and
wherein the aft portion includes at least a first opening and a second opening defined through it,
wherein the first opening and the second opening are separated from one another by a part of the aft portion of the golf club head base member, and
wherein the part of the aft portion separating the first opening and the second opening has a first surface and a second surface opposite the first surface; and
a polymeric body engaged with the aft portion of the golf club head base member at least in part by embedding the part of the aft body portion separating the first opening and the second opening within a polymer material of the polymeric body so that the polymeric material extends through and fills the first and second openings and covers both the first and second surfaces of the part of the aft body portion separating the first opening and the second opening;
wherein the polymeric body overlays the exterior surface of the aft portion of the golf club head base member,
wherein at least some portion of an exterior surface of the polymeric body is coated with a metal containing material.

2. A golf club head according to claim 1, wherein the first opening and the second opening are located at a crown area of the aft portion of the golf club head base member.

3. A golf club head according to claim 1, wherein the aft body portion is integrally formed with the face portion.

4. A golf club head according to claim 3, wherein the aft body portion is formed from a metal alloy material.

5. A golf club head according to claim 1, wherein the aft body portion is a separate part that is engaged with the face portion to form a unitary structure for the golf club head base member.

6. A golf club head according to claim 5, wherein the aft body portion is welded to the face portion.

7. A golf club head according to claim 5, wherein the aft body portion is engaged with the face portion via mechanical connectors.

8. A golf club head according to claim 1, wherein the aft body portion further includes a third opening defined through it, wherein the third opening is separated from the second opening by a second part of the aft portion, and wherein the polymeric body further extends through and fills the third opening such that the second part of the aft portion is embedded within the polymeric body.

9. A golf club head, comprising:
a face portion; a frame member integrally formed or engaged with the face portion,
wherein the face portion and the frame member are joined at an inward stepped area, and
wherein the frame member includes a plurality of openings defined through it, including at least a first opening and a second opening,
wherein the first opening and the second opening are separated from one another by a part of the frame member, and
wherein the part of the frame member separating the first opening and the second opening has a first surface and a second surface opposite the first surface;
and a polymeric body engaged with the frame member,
wherein the polymeric body overlays and fills in the inward stepped area,
wherein the part of the frame member separating the first opening and the second opening is embedded within the polymeric body so that polymeric material of the polymeric body extends through and fills the first opening and the second opening and covers both the first and second surfaces of the part of the frame member separating the first opening and the second opening;
wherein at least some portion of an exterior surface of the polymeric body is coated with a metal containing material.

10. A golf club head according to claim 9, wherein the first opening and the second opening are formed in a crown portion of the frame member.

11. A golf club head according to claim 9, wherein the frame member is integrally formed with the face portion.

12. A golf club head according to claim 11, wherein the frame member is formed from a metal alloy material.

13. A golf club head according to claim 9, wherein the frame member is a separate part that is engaged with the face portion.

14. A golf club head according to claim 13, wherein the frame member is welded to the face portion.

15. A golf club head according to claim 13, wherein the frame member is engaged with the face portion via mechanical connectors.

16. A golf club head according to claim 9, wherein the frame member further includes a third opening defined through it, wherein the third opening is separated from the second opening by a second part of the frame member, and wherein the polymeric body further extends through and fills the third opening such that the second part of the frame member is embedded within the polymeric body.

* * * * *